No. 659,464. Patented Oct. 9, 1900.
H. N. BLUNT.
TILE BASE.
(Application filed Mar. 14, 1900.)
(No Model.)
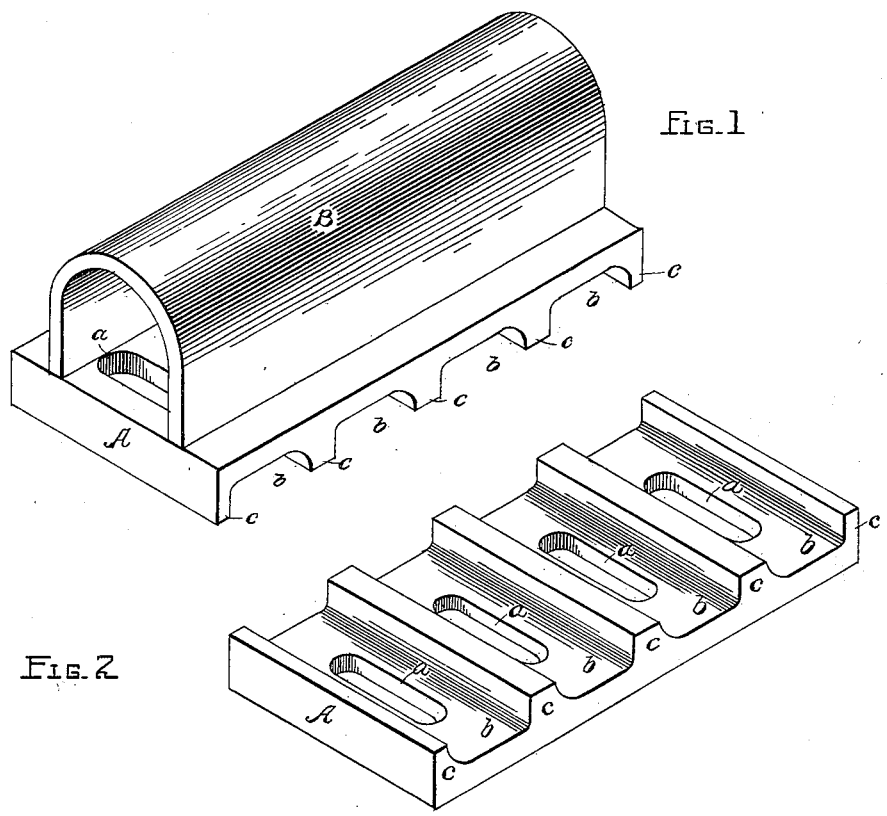
Fig. 1.
Fig. 2.
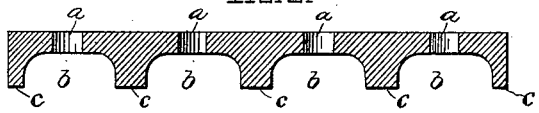
Fig. 3.
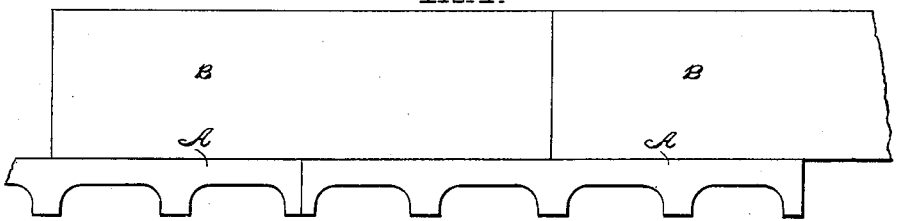
Fig. 4.
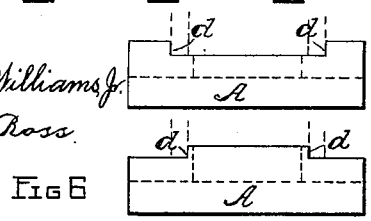
Fig. 5.
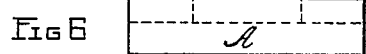
Fig. 6.
WITNESSES:
Albert H. Williams Jr.
Peter A. Ross
INVENTOR
Harrison N. Blunt
BY
Henry Connett
ATTORNEY

United States Patent Office.

HARRISON N. BLUNT, OF NEW YORK, N. Y.

TILE-BASE.

SPECIFICATION forming part of Letters Patent No. 659,464, dated October 9, 1900.

Application filed March 14, 1900. Serial No. 8,570. (No model.)

*To all whom it may concern:*

Be it known that I, HARRISON N. BLUNT, a citizen of the United States, residing in the borough of Manhattan, in the city, county, and State of New York, have invented certain new and useful Improvements in Tile-Bases, of which the following is a specification.

This invention relates to the class of tiles for distributing sewage or waste liquids. Such tiles form a subterranean conduit and have outlet-apertures of some kind at intervals to permit the liquid to escape to the surrounding earth, which absorbs it. It is desirable in using this class of tiles to so construct the latter that the liquid shall escape through outlets properly distributed along the conduit and be directed thence laterally to the earth or soil, so that it may not flow along the line of the conduit.

The object of the present invention is to provide a base for a tile—such as the known horseshoe-tile, for example—which shall be so formed as to properly distribute the sewage or waste liquids flowing through the conduit.

In the accompanying drawings, which illustrate an embodiment of the invention, Figure 1 is a perspective view of the tile-base and tile. Fig. 2 is a perspective view of the tile-base detached, showing the under side thereof. Fig. 3 is a longitudinal section of the base. Fig. 4 is a side elevation of the base and tile, showing them breaking joints. Figs. 5 and 6 show shoulders formed on the base for positioning the tile.

A represents the base, and B a horseshoe-tile mounted thereon. This latter is a known form of open-bottomed tile.

The base A has a plurality of apertures $a$ in its crown or top, which are by preference elongated or slot-like transversely of the base and equally spaced, and it has in its under side a plurality of transverse grooves or channels $b$, into which the respective apertures $a$ open. This construction permits the liquid flowing through the conduits formed by the tile B to escape by gravity through the apertures or slots $a$ and causes it to flow out laterally along the transverse channels $b$, which latter, owing to the width of the base, extend out beyond the lateral limits of the tile.

The base A has been described as having transverse channels $b$ formed in its lower face; but it may as well be considered as having a series of transverse ribs $c$ across said face between the apertures $a$. The ribs $c$ form the channels $b$, and the latter are the operative features.

Fig. 1 shows the tile B of the same length as the base A and mounted directly on the base, so that their ends are coincident; but the tile-sections may break joints with the base-sections in laying, as shown in Fig. 4.

To steady the tile in its position on the base and also insure proper positioning and alinement of the tile with the base, the base may have shoulders $d\ d$ formed on it in molding. Two ways of forming these shoulders are illustrated, respectively, in Figs. 5 and 6. The former shows the shoulders situated exteriorly to the tile and the latter situated interiorly.

The tile and tile-base are well adapted also for land-drainage purposes in general, and particularly in cases where the water accumulated from wet or swampy spots is required to be distributed to the drier ground along the line of the conduit.

The number of ribs on the bottom of the base is not very important, as their function is to raise the apertures $a$ above the general level of the ground on which the base rests. The principal object in making the base extra wide is mainly to adapt it for open-bottomed tiles of different widths.

Having thus described my invention, I claim—

1. A base for land-draining tiles, having transversely-extending ribs on its under side and apertures in it opening into the respective spaces between said ribs.

2. A tile-base having a plurality of transverse channels $b$ in its lower face, and a plurality of slot-like apertures $a$, opening into the respective channels $b$.

3. The combination with an open-bottomed tile, of a tile-base which extends laterally beyond said tile, said base having in it a plurality of apertures $a$, and in its lower face a plurality of transversely-extending channels $b$, into which said apertures respectively open.

4. A tile-base having apertures $a$, transverse channels $b$, and shoulders $d$, $d$, in combination with an open-bottomed tile adapted to fit up to said shoulders, substantially as set forth.

5. The combination with an open-bottomed tile, of a base upon which said tile rests, said base having apertures in it, substantially as set forth.

6. The combination with an open-bottomed tile, of a base upon which said tile rests, said base having apertures in it and ribs on its under side, substantially as set forth.

In witness whereof I have hereunto signed my name, this 28th day of February, 1900, in the presence of two subscribing witnesses.

HARRISON N. BLUNT.

Witnesses:
HENRY CONNETT,
PETER A. ROSS.